United States Patent [19]
Shields et al.

[11] 3,887,538
[45] June 3, 1975

[54] PROCESS FOR SELECTIVELY CLEAVING CARBOXYL PROTECTING GROUPS FROM MULTI-CARBOXYL PEPTIDES OR AMINO ACIDS AND COMPOUNDS USEFUL THEREIN

[75] Inventors: James E. Shields; Edward L. Smithwick, Jr., both of Indianapolis, Ind.

[73] Assignee: Eli Lilly and Company, Indianapolis, Ind.

[22] Filed: Nov. 19, 1971

[21] Appl. No.: 200,607

[52] U.S. Cl...... 260/112.5; 260/309; 260/326.14 T; 260/470; 260/471 A; 260/481 R; 260/481 C; 260/482 R; 260/482 P
[51] Int. Cl. C07c 103/52; C07c 101/00; C07d 27/00
[58] Field of Search............ 260/112.5, 309, 326.14, 260/470, 471, 481, 482

[56] References Cited
UNITED STATES PATENTS
3,325,466   6/1967   Anderson et al. ............... 260/112.5
3,388,113   6/1968   Guttmann et al. ............... 260/112.5

OTHER PUBLICATIONS
Katsoyannis et al., J. Am. Chem. Soc., 88, 5618 (1966).
Fosker et al., J. Chem. Soc., 4922 (1965).
Nicolaides et al., J. Med. Chem., 11, 74 (1968).
Schroder et al., Ann. Chem., 673, 208 (1964).
Roberts, J. Am. Chem. Soc., 76, 6203 (1954).
Guttmann, Helv. Chim. Aeta, 44, 738 (1961).
Zervas et al., J. Am. Chem. Soc., 87, 100 (1965).

*Primary Examiner*—Lewis Gotts
*Assistant Examiner*—Reginald J. Suyat
*Attorney, Agent, or Firm*—William C. Martens, Jr.; Everet F. Smith

[57] ABSTRACT

A p-nitrobenzyl or 2,2,2-trihaloethyl carboxyl protecting group is selectively cleaved from a multi-carboxyl amino acid or peptide containing such group as well as another carboxyl protecting group or groups by reacting such amino acid or peptide with zinc and dilute mineral acid.

4 Claims, No Drawings

PROCESS FOR SELECTIVELY CLEAVING CARBOXYL PROTECTING GROUPS FROM MULTI-CARBOXYL PEPTIDES OR AMINO ACIDS AND COMPOUNDS USEFUL THEREIN

BACKGROUND OF THE INVENTION

Polypeptides are condensation products resulting from the interaction of two or more amino acids to form chains of amino acid residues. The reaction involves the joining of an amino function of one amino acid to a carboxyl function of another amino acid resulting in the formation of an amide linkage and the effective elimination of one molecule of water. A chain of amino acids can be produced, and, depending upon its ultimate length, a substance of relatively complex structure can result. The final polypeptide product comprising a chain of amino acids typically may include a free carboxyl function at one end of a chain and a free amino function at another end.

Several naturally occurring amino acids contain other reactive functional groups in addition to the essential amino and carboxyl functions. Thus, in addition to the terminal carboxyl and amino groups, many polypeptides will contain reactive functional groups interspersed at various points in the chain of amino acid residues. The number of these additional reactive functionalities, of course, may increase markedly as the polypeptide chain is lengthened.

Synthesis of polypeptides in general involves the careful building of peptide fragments by combination of selected individual amino acids to produce chains containing an ordered arrangement of specific amino acid residues. Several such fragments may first be prepared and these fragments may then be joined to produce a longer chain polypeptide. Any attempted synthesis of specific polypeptides must include a careful consideration of the impact which any set of reaction conditions employed during the chain building process will have on each of the reactive functionalities present in the partially synthesized polypeptide.

In order to avoid degradation of reactive functionalities present in the polypeptide fragment while subjecting the fragment to further reaction in the continuing synthesis of the ultimate polypeptide, it has become customary to employ various blocking groups which react with and render inactive the otherwise reactive functionalities present in the partially prepared polypeptides. These blocking groups in general either preclude a possible degradation of the partially prepared polypeptide or prevent undesired reactions and will normally be retained during the entire course of the synthesis. Removal of these blocking groups normally will be carried out only after the intended amino acid sequence has been attained. Upon reaching this point, the blocking groups will be removed by recognized methods with production of the desired polypeptide.

In addition to the use of appropriate blocking groups on reactive functions present on amino acid residues internal to the chain structure, it is necessary to include a blocking group on the terminal carboxyl or amino function not involved in the reaction step immediately contemplated. In general, therefore, all labile groups will be appropriately blocked except those participating in the intended reaction.

One of the functional groups which is particularly susceptible to degradation during polypeptide synthesis is the carboxyl function. Such a group can be present either at the terminal or the internal portion of the peptide chain. A carboxyl function on the internal portion of a peptide chain can be derived, for example, from the $\beta$-carboxyl group present in aspartic acid or the $\gamma$-carboxyl group present in glutamic acid in those instances in which the $\alpha$-carboxyl function participates in the formation of the amide backbone of the peptide.

In many peptide syntheses it is desirable to retain one protected carboxyl group intact while cleaving the protecting group from another carboxyl. It is precisely this situation to which this invention is directed since it permits a selective cleavage of carboxyl protecting groups by judicious selection and placement of the protecting groups. This invention uses p-nitrobenzyl and 2,2,2-trihaloethyl groups as carboxyl protecting groups and achieves a selective cleavage of carboxyl protecting groups. It has previously been recognized that p-nitrobenzyl and 2,2,2-trihaloethyl ester groups are more readily cleaved from cephalosporins than are other ester groups; however, the use of such groups in peptide synthesis to accomplish selective cleavage of carboxyl protecting groups has nowhere been previously recognized.

SUMMARY OF THE INVENTION

The present invention provides a process for selectively cleaving certain selected carboxyl blocking groups in polypeptides while avoiding cleavage of other protected carboxyl functions. More particularly, the present invention provides a process for selectively cleaving the terminal carboxyl blocking group while avoiding cleavage of protected internal carboxyl functions. Additionally, the present invention provides amino acids and polypeptides containing appropriate blocking groups which permit the selective cleavage of the protecting groups.

This invention is directed to novel compounds useful in the synthesis of polypeptides and to a process for the selective cleavage of these novel compounds. Broadly, the compounds of this invention are characterized by the formula

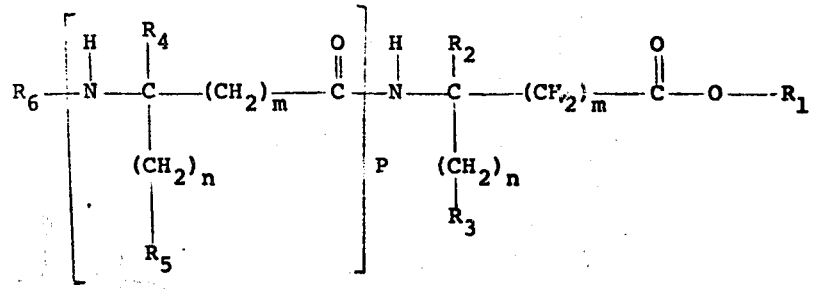

in which $R_1$ is $C_1-C_5$ alkyl, $C_5-C_7$ cycloalkyl, benzyl, $C_1-C_5$ alkoxybenzyl, p-nitrobenzyl, or 2,2,2-trihaloethyl;

$R_2$ and each $R_4$ independently are hydrogen or $C_1-C_5$ alkyl, $R_3$ and each $R_5$ independently are hydrogen, $C_1-C_5$ alkyl, hydroxy-substituted $C_1-C_5$ alkyl, protected hydroxy-substituted $C_1-C_5$ alkyl, amino-substituted $C_1-C_5$ alkyl, protected amino-substituted $C_1-C_5$ alkyl, mercapto-substituted $C_1-C_5$ alkyl, protected mercapto-substituted $C_1-C_5$ alkyl, $C_1-C_5$ alkyl mercapto-substituted $C_1-C_5$ alkyl, guanidino-substituted $C_1-C_5$ alkyl, protected guanidino-substituted $C_1-C_5$ alkyl, imidazolylmethyl, protected imidazolylmethyl, indolylmethyl, phenyl, 4-hydroxyphenyl, protected 4-hydroxyphenyl, carbamyl-substituted $C_1-C_5$ alkyl, or carboxy-substituted $C_1-C_5$ alkyl protected by any of the $R_1$ substituents, at least one $R_3$ or $R_5$ being a protected carboxy-substituted $C_1-C_5$ alkyl and at least one but not all of the protected carboxy substituents present in said compound being protected by

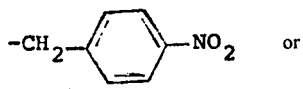    or

—$CH_2CX_3$ in which X is halogen;

$R_6$ is hydrogen or an amino-protecting group;

P is 0 or an integer from 1 to 14;

and each $m$ and each $n$ independently are 0 or an integer from 1 to 4.

The process aspect of this invention is directed to the selective cleavage of the novel compounds of this invention and comprises reducing said compounds with zinc and dilute mineral acid, thereby cleaving each

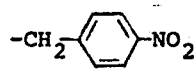

or 2,2,2-trihaloethyl group from its respective carboxy function while avoiding cleavage of all other protected carboxy substituents.

Further aspects and embodiments of this invention will become evident from the detailed discussion which follows.

DETAILED DESCRIPTION OF THE INVENTION

As hereinbefore mentioned, this invention relates to a process for selectively cleaving blocking groups from amino acids and polypeptides having at least two blocked carboxyl functions and to particular blocked amino acids and polypeptides useful in said process. The selective cleavage process of this invention results in hydrolysis to free carboxyl groups of those carboxyl functions protected by p-nitrobenzyl and 2,2,2-trihaloethyl groups with avoidance of cleavage of all other protected carboxyl functions.

It is an essential feature of the compounds of this invention that they contain at least two blocked carboxyl functions. At least one but not all of the carboxyl functions of the compounds of this invention must include an ester-forming blocking group resulting from replacement of the carboxyl hydrogen with

or —$CH_2$—$CX_3$ in which X is a halogen. At least one of the remaining carboxyl functions must include an ester-forming blocking group resulting from replacement of the carboxyl hydrogen with $C_1-C_5$ alkyl, $C_5-C_7$ cycloalkyl, benzyl or $C_1-C_5$ alkoxy-substituted benzyl.

A more specific embodiment of this invention is a blocked amino acid or polypeptide of the formula

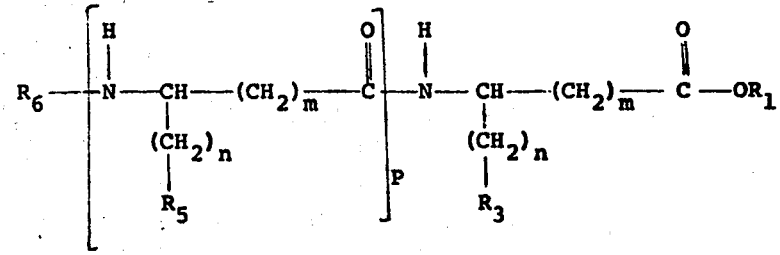

in which $R_1$, $R_3$, $R_5$, $R_6$, $m$, $n$, and P are as hereinbefore defined.

A preferred embodiment of this invention is a blocked amino acid or polypeptide of the formula

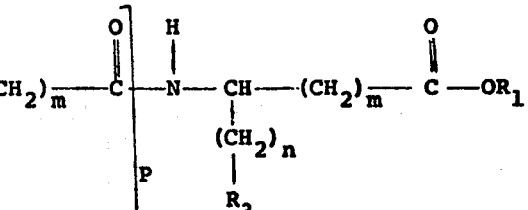

in which $R_1$, $R_3$, $R_5$, $R_6$, and P are as hereinbefore defined.

A more preferred embodiment of this invention is a blocked amino acid or polypeptide of the formula

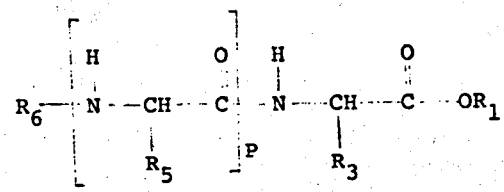

in which $R_1$, $R_5$, $R_6$, and P are as hereinbefore defined.

A highly preferred embodiment of this invention is a blocked amino acid or polypeptide of the formula

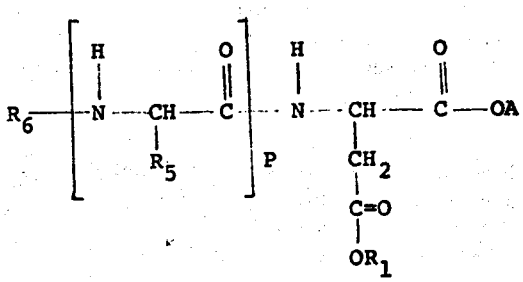

in which A is

or —CH$_2$—CX$_3$, and
R$_1$, R$_5$, R$_6$, and P are as hereinbefore defined.

Another highly preferred embodiment of this invention is a blocked amino acid of the formula

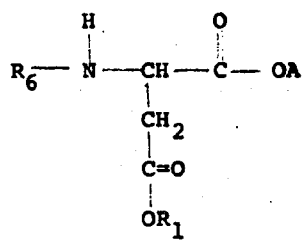

in which A and R$_6$ are as hereinbefore defined and R$_1$ is C$_1$–C$_5$ alkyl, C$_5$–C$_7$ cycloalkyl, benzyl, or C$_1$–C$_5$ alkoxybenzyl.

As used herein, the term "C$_1$–C$_5$ alkyl" includes, for example, methyl, ethyl, n-propyl, isopropyl, n-butyl, 2-methylpropyl, 1-methylpropyl, t-butyl, n-pentyl, 1-methylbutyl, 2-methylbutyl, 3-methylbutyl, 2-ethylpropyl, 2,2-dimethylpropyl, and the like.

"C$_1$–C$_5$ alkoxy" includes methoxy, ethoxy, propoxy, 1-methylethoxy, n-butoxy, t-butoxy, 1-methylpropoxy, n-amyloxy, and the like.

"Halogen" refers to fluorine, chlorine, bromine and iodine.

"Hydroxy-substituted C$_1$–C$_5$ alkyl" includes hydroxymethyl, 1-hydroxyethyl, 2-hydroxyethyl, 1-hydroxypropyl, 2-hydroxypropyl, 3-hydroxybutyl, 2-hydroxyamyl, and the like.

"Protected hydroxy-substituted C$_1$–C$_5$ alkyl" includes the aforementioned hydroxy-substituted groups wherein the hydroxy function is protected by an appropriate protecting group well known in the art. Appropriate protecting groups include C$_1$–C$_4$ alkyl, for example, methyl, ethyl, and tert-butyl; benzyl; substituted benzyl, such as p-alkoxybenzyl; and C$_1$–C$_3$ alkanoyl, such as formyl, acetyl, and propionyl.

"Amino-substituted C$_1$–C$_5$ alkyl" includes aminomethyl, 1-aminoethyl, 2-aminoethyl, 2-aminopropyl, 3-aminopropyl, 4-aminobutyl, 3-aminoamyl, and the like.

"Protected amino-substituted C$_1$–C$_5$ alkyl" includes groups such as the aforementioned amino-substituted C$_1$–C$_5$ alkyl groups protected by an appropriate protecting group well known in the art. Appropriate protecting groups include carbobenzoxy, p-methoxycarbobenzoxy, t-butoxycarbonyl, t-amyloxycarbonyl, adamantyloxycarbonyl, cyclopentyloxycarbonyl, and the like.

"Mercapto-substituted C$_1$–C$_5$ alkyl" includes groups such as mercaptomethyl, 1-mercaptoethyl, 2-mercaptoethyl, 3-mercaptopropyl, 3-mercaptobutyl, 5-mercaptoamyl, and the like.

"Protected mercapto-substituted C$_1$–C$_5$ alkyl" refers to groups such as the aforementioned mercapto-substituted C$_1$–C$_5$ alkyl protected from reaction by an appropriate protecting group well known in the art. Appropriate protecting groups include benzyl, tetrahydropyranyl, C$_1$–C$_3$ alkylcarbamoyl such as ethylcarbamoyl, p-methoxybenzyl, β,β-diethoxycarbonylethyl, benzyloxycarbonyl, and the like.

"C$_1$–C$_5$ alkyl mercapto-substituted C$_1$–C$_5$ alkyl" refers to groups such as methylmercaptomethyl, 1-methylmercaptoethyl, 2-methyl-mercaptoethyl, 2-ethylmercaptoethyl, 3-(1-propylmercapto)butyl, 3-(ethylmercapto)amyl, and the like.

"Guanidino-substituted C$_1$–C$_5$ alkyl" includes groups such as guanidinomethyl, 1-guanidinoethyl, 2-guanidinoethyl, 3-guanidinopropyl, 2,2-dimethyl-1-guanidinoethyl, 4-guanidinobutyl, 2,2-dimethyl-3-guanidinopropyl, and the like.

"Protected guanidino-substituted C$_1$–C$_5$ alkyl" refers to groups such as the aforementioned guanidino-substituted C$_1$–C$_5$ alkyl having the guanidino function protected by an appropriate protecting group well known in the art. Appropriate protecting groups include carbobenzoxy, t-butoxycarbonyl, t-amyloxycarbonyl, adamantyloxycarbonyl, and the like.

"Protected imidazoylmethyl" refers to protection of the imidazolyl group by substitution of the amino hydrogen with an appropriate protecting group well known in the art. Appropriate groups include, for example, benzyl, t-butoxycarbonyl, adamantyloxycarbonyl, and the like.

"Protected 4-hydroxyphenyl" refers to a 4-hydroxyphenyl group having the hydroxy substituent protected by an appropriate protecting group well known in the art. Appropriate protecting groups include C$_1$–C$_4$ alkyl, for example, methyl, ethyl and t-butyl, benzyl, substituted benzyl, such as p-alkoxybenzyl, and C$_1$–C$_3$ alkanoyl, such as acetyl and propionyl.

Carboxyl function protecting groups which are selectively cleavable in accordance with the provisions of this invention include, for example, p-nitrobenzyl; 2,2,2-trichloroethyl; 2,2,2-tribromoethyl; 2,2,2-trifluoroethyl; and 2,2,2-triiodoethyl.

Suitably protected polycarboxy amino acids are within the scope of this invention and are defined by the general structural formula in the instance wherein P is O. The amino acids thus defined contain at least two carboxyl groups and are blocked as herein defined to permit selective cleavage of less than all of the carboxyl protecting groups. Aspartic acid and glutamic acid are typical of amino acids which satisfy these requirements. Such amino acids, appropriately blocked in accordance with this invention, can then be employed in building polypeptide chains during the construction of which it will be desirable to selectively remove one or more carboxyl protecting groups while avoiding removal of others.

Suitably protected amino acids can be prepared by various sequences of reaction steps. One such sequence involves reacting an unprotected amino acid, for example aspartic acid, with a reagent which will suitably block the amino function. The thus-obtained N-blocked amino acid is then esterified using an appropriate esterifying reagent well known to those skilled in the art such as an alcohol or a halide and containing a blocking group other than one which is selectively cleavable in accordance with this invention. The esterifying reagent is used in an amount sufficient to block all carboxyl functions present in the amino acid. Less than all of the thus-blocked carboxyl functions are then selectively deblocked using a mildly alkaline reagent such as lithium hydroxide after which an appropriate selectively cleavable blocking group such as a p-nitrobenzyl a 2,2,2-trihaloethyl group is used to block the previously freed carboxyl function. Other methods of preparing suitable structures containing an appropriate mixture of carboxyl blocking groups are available and will be readily apparent to those skilled in the art.

Illustrative of the amino acids of the invention suitable for selective cleavage according to the process are the following compounds:

p-nitrobenzyl β-0-benzyl-L-aspartate
2,2,2-tribromoethyl β-0-benzyl-L-aspartate
2,2,2-trichloroethyl β-0-benzyl-L-aspartate
benzyl β-0-(p-nitrobenzyl)aspartate
benzyl β-0-(2,2,2-triiodoethyl)aspartate
benzyl β-0-(2,2,2-trichloroethyl)aspartate
p-nitrobenzyl N-benzyloxycarbonyl-β-0-benzyl-L-aspartate
2,2,2-trichloroethyl N-benzyloxycarbonyl-β-0-benzyl-L-aspartate
benzyl N-benzyloxycarbonyl-β-0-(p-nitrobenzyl)aspartate
benzyl N-benzyloxycarbonyl-β-0-(2,2,2-trichloroethyl)aspartate
p-nitrobenzyl N-benzyloxycarbonyl-β-0-(t-butyl)aspartate
2,2,2-trichloroethyl N-benzyloxycarbonyl-β-0(t-butyl)aspartate
p-nitrobenzyl γ-0-benzylglutamate
2,2,2-trifluoroethyl γ-0-benzylglutamate
benzyl γ-0-(p-nitrobenzyl)glutamate
benzyl γ-0-(2,2,2-trichloroethyl)glutamate
p-nitrobenzyl N-benzyloxycarbonyl-γ-0-benzylglutamate
2,2,2-tribromoethyl N-benzyloxycarbonyl-γ-0-benzylglutamate
benzyl N-benzyloxycarbonyl-γ-0-(p-nitrobenzyl)glutamate
t-butyl N-benzyloxycarbonyl-γ-0-(2,2,2-trichloroethyl)glutamate
p-nitrobenzyl N-benzyloxycarbonyl-β-methyl-β-0-(t-butyl)aspartate
2,2,2-trichloroethyl N-benzyloxycarbonyl-β-methyl-β-0-(t-butyl)aspartate
p-nitrobenzyl N-tert-butoxycarbonyl-β-0-benzyl-L-aspartate
2,2,2-trichloroethyl β-amino-γ-benzyloxycarbonylbutyrate
2,2,2-trichloroethyl β-amino-β-methyl-γ-benzyloxycarbonylbutyrate Synthesis of polypeptides involves coupling of amino acids or peptide fragments by reaction of the carboxyl function of one with the amino function of another to produce an amide linkage. In order to realize the coupling, it is essential, first, that all reactive functionalities not participating directly in the reaction be inactivated by appropriate blocking groups, and, secondly, that the carboxyl function which is to be coupled be appropriately activated by known techniques so that coupling can be accomplished. All of this involves a careful selection of both reaction sequence and reaction conditions to achieve the desired peptide.

Thus, for example, in building a polypeptide from individual amino acids and/or peptide fragments, it may become necessary at several steps in the total synthesis to cleave a carboxyl blocking group to convert the carboxyl function of an amino acid or peptide fragment to a free carboxyl and then to activate it for the intended subsequent coupling step. In many instances the amino acid or peptide fragment will include a multiplicity of carboxyl functions, each of which must be appropriately protected, and only one of which is intended to participate in a coupling reaction. It is precisely this situation to which this invention can be advantageously applied since it permits a specific and predetermined carboxyl function to be freed for further coupling while other carboxyl functions remain protected.

In rendering the carboxyl function active to the coupling reaction, it is common to prepare an active ester of the amino acid or polypeptide. One such ester which can be employed is the 2,4,5-trichlorophenyl ester of the N-protected amino acid or polypeptide. The active ester will then be reacted with a selected appropriately C-protected amino acid or polypeptide to achieve the desired coupled product.

Another method for rendering the carboxyl function active to the coupling reaction is by conversion to its anhydride. The anhydride may be symmetrical or unsymmetrical. A symmetrical anhydride contains two residues of the same amino acid or peptide fragment with elimination of one molecule of water. Unsymmetrical or mixed anhydrides result from two different acids. In addition to the amino acid or peptide fragment, usually the other acid will be a derivative of carbonic acid. Examples of acid chlorides used to form such mixed anhydrides are ethyl chloroformate, phenyl chloroformate, sec-butyl chloroformate, isobutyl chloroformate, pivaloyl chloroformate, and the like.

In addition to the protected amino acids which can be selectively cleaved and some of which are mentioned hereinabove, protected polypeptides also are a part of this invention. These polypeptides, each of which can be selectively cleaved to free one or more but not all carboxyl functions present in the structure, are illustrated by the following structures:

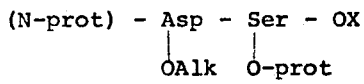

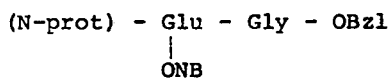

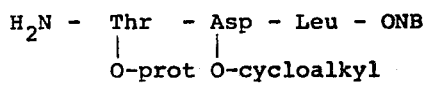

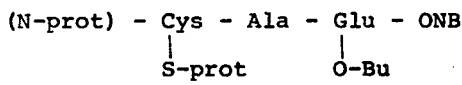

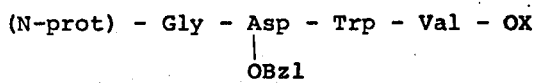

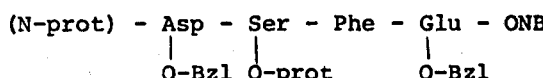

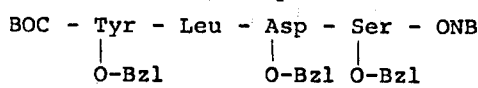

```
                        -Continued
(N-prot) - Glu - Leu - Asp - Gly - Lys - OX
                 |           |          |
                 OBzl        OBzl       N-prot BOC - Thr - Phe - Thr - Ser - Asp - ONB
            |          |     |     |
            OBzl       OBzl  OBzl  OBzl H₂N - Gly - Arg - Val - Glu - Ala - Met - OX
            |                 |
            (N-prot)₂         OAlk BOC - Ser - Arg - Arg - Ala - Gln - Asp - ONB
      |     |     |                 |
      OBzl  (CBz)₂ (CBz)₂           OBzl BOC - Tyr - Ser - Lys - Tyr - Leu - Asp - ONB
      |     |     |     |           |
      OBzl  OBzl  CBz   OBzl        OBzl (N-prot) - Leu - Asp - Met - Val - Tyr - Glu - Ala - ONB
                 |                 |           |
                 OBzl              O-prot      OX (N-prot) - Gly - Phe - Asp - Asp - Leu - His - Ser - O - Alk
                       |     |           |     |
                       OX    OX          N-prot O-prot (N-prot) - Phe - Cys - His - Glu - Asp - Ala - Lys - Glu - ONB
                 |     |     |     |           |     |
                 S-prot N-prot OBzl OBzl       N-prot OBzl (N-prot) - Ser - Asp - Met - Val - Asp - Ser - Gly - Trp - OX
           |     |                 |     |
           O-prot O-Alk            O-Alk O-prot AdOC - His - Ser - Gln - Gly - Thr - Phe - Thr - Ser - Asp - ONB
       |     |                       |           |     |     |
       AdOC  OBu                     OBzl        OBzl  OBzl  OBzl H₂N - Val - His - Asp - Trp - Ala - Glu - Met - Ser - Gly - Tyr - ONB
            |     |                             |           |
            N-prot O-AlkoxyBzl                  O-AlkoxyBzl O-prot   O-prot (N-prot) - Trp - Met - Arg - Gly - Tyr - Asp - Glu - Val - Lys -
                       |           |     |     |           |
                       (N-prot)₂   O-prot ONB  OBzl        N-prot Asp - Leu - ONB
                                    |
                                    OBzl (N-prot) - Cys - Phe - Glu - Tyr - Ala - Asp - Asp - Met - Thr -
           |           |     |           |     |           |
           S-prot      O-Alk O-prot      O-Alk O-Alk       O-prot Phe - Ser - Asp - OX
                                  |     |
                                  O-prot O-Alk (N-prot) - Ser - Asp - Leu - Lys - Ala - Gly - Cys - Met - Thr -
           |     |           |                 |           |
           O-prot O-Alk      N-prot            S-prot      O-prot Glu - His - His - Gly - ONB
                      |     |     |
                      O-Alk N-prot N-prot
```

```
(N-prot) - Asp - Lys - Val - Tyr - Asn - Gly - Glu - Thr - Ala -
          |     |           |                 |     |
          OBzl  N-prot      O-prot            OBzl  O-prot Cys - Trp - Cys - Gly - Asp - OX
                    |          |          |
                    S-prot     S-prot     OBzl AdOC - His - Ser - Gln - Gly - Thr - Phe - Thr - Ser - Asp - Tyr -
       |                       |           |     |     |     |
       AdOC OBu                OBzl        OBzl  OBzl  OBzl  OBzl Ser - Lys - Tyr - Leu - Asp - ONB
              |     |     |           |
              OBzl  CBz   OBzl        OBzl
```

In the above illustrative peptides as well as elsewhere in the specification and claims, the following abbreviations, most of which are well known and commonly used in the art, are employed:

Ala - Alanine
Arg - Arginine
Asn - Asparagine
Asp - Aspartic acid
Cys - Cysteine
Gln - Glutamine
Glu - Glutamic acid
Gly - Glycine
His - Histidine
Leu - Leucine
Lys - Lysine
Met - Methionine
Phe - Phenylalanine
Ser - Serine
Thr - Threonine
Trp - Tryptophan
Tyr - Tyrosine
Val - Valine
N-prot - Nitrogen protecting group
O-prot - Oxygen protecting group
S-prot - Sulfur protecting group
Bzl - Benzyl
NB - p-Nitrobenzyl
X - 2,2,2-Trihaloethyl
CBz - Benzyloxycarbonyl
Alk - Alkyl
Bu - Tertiary butyl
BOC - Tertiary butoxycarbonyl
AdOC - Adamantyloxycarbonyl
AlkoxyBzl - Alkoxybenzyl Both the protected amino acids and protected polypeptides having structures such as those illustrated hereinabove can be selectively cleaved in accordance with the process of this invention. This selective cleavage is accomplished by treating the appropriately blocked amino acid or polypeptide with zinc and dilute acid at a pH of from about 2.0 to about 4.5 and at a temperature of from about 0°C. to about 50°C., thereby removing from all protected carboxyl functions 2,2,2-trihaloethyl and p-nitrobenzyl groups while avoiding removal of all other protected carboxyl functions.

Any solvent or mixture of solvents which will dissolve the amino acid or polypeptide and which is miscible with the dilute acid can be suitably employed. Solvents such as esters and amides, for example, ethyl acetate, dimethylformamide, dimethylacetamide, and like solvents as well as other commonly employed solvents can be used. Mixtures of such solvents can likewise be employed as well as mixtures of such solvents with water.

The dilute acid which is employed can be any acid capable of achieving and maintaining the essential pH range throughout the period of reaction. Although dilute hydrochloric acid is preferred, mineral acids and suitable organic acids can be employed for example, other halogen acids as well as sulfuric acid and acetic acid.

The selective cleavage is carried out at a pH in the range of from about 2.0 to about 4.5. It is preferred to react the amino acid or polypeptide with the zinc and dilute acid at a pH of from about 2.5 to about 3.5, with a pH of about 3.0 being especially preferred.

The cleavage is accomplished at a temperature of from about 0°C. to about 50°C. Most advantageously, however, a temperature from about 20°C. to about 30°C. is employed.

The protected amino acids and protected peptides of this invention are useful for the preparation of a wide variety of peptides. For example, they can be employed in preparing peptide fragments used in the synthesis of the hyperglycemic agent glucagon. Likewise, the compounds and process of this invention can be employed in the synthesis of such peptides as oxytocin, vasopressin, secretin, insulin, gastrin, proinsulin, thyrocalcitonin, corticotropin releasing factor (CFR), adrenocorticotropic hormone (ACTH), and cholecystokinin.

The examples which follow are illustrative of the process of this invention as well as the protected amino acids and polypeptides which are usable therein.

EXAMPLE I:

Preparation and Selective Cleverage of p-nitrobenzyl N-benzyloxycarbonyl-β-O-benzyl-L-aspartate About 85 g. (0.318 mole) of N-benzyloxycarbonyl-L-aspartic acid, 62.5 ml. (0.318 mole) of dicyclohexylamine, and 76 ml. (0.636 mole) of α-benzyl bromide were dissolved in 750 ml. of dimethylformamide. The mixture was stirred at room temperature for about 16–17 hours during which time white solid dicyclohexylamine hydrobromide collected in the mixture. Due to the large amount of solid, methylene chloride was added, bringing the volume of the mixture to a total of about 1400 ml. The mixture was filtered, ethyl acetate was added and the mixture was refiltered, washed successively with 1N HCl, water, 2N KHCO$_3$, and water, dried over MgSO$_4$, filtered and evaporated in vacuo. The dibenzyl ester of N-benzyloxycarbonyl-L-aspartic acid was collected as an oil.

The dibenzyl ester was dissolved in 1600 ml. of a 1:4 (V:V) mixture of water and acetone. About 191 ml. of 0.97N lithium hydroxide solution was added at room temperature over a 2 hour period, and the resulting mixture was stirred for an additional hour. The acetone content of the mixture was removed in vacuo, and the remaining aqueous portion was washed with ether and acidified to pH 2.5 with 6N HCl, after which crystals formed in the aqueous mixture. The crystals were filtered from the mixture and recrystallized from benzene affording 11.80 g. of N-benzyloxycarbonyl-$\beta$-O-benzyl-L-aspartic acid.

Analysis, Calc. for $C_{19}H_{19}NO_6$: C, 63.86; H, 5.36; N, 3.92.

Found: C, 63.62; H, 5.27; N, 4.01.

About 11.8 g. (32.85 millimoles) of N-benzyloxycarbonyl-$\beta$-O-benzyl-L-aspartic acid, 7.35 g. (34.0 millimoles) of p-nitrobenzyl bromide, and 4.52 ml. (32.4 millimoles) of triethylamine were dissolved in 1000 ml. of ethyl acetate. The solution was refluxed for twenty-two hours, after which it was cooled, filtered, washed successively with water, 2N $KHCO_3$, and water, dried over $MgSO_4$, and evaporated to dryness. Recrystallization from a benzene-petroleum ether mixture afforded 13.65 grams (84.6 percent) of p-nitrobenzyl N-benzyloxycarbonyl-$\beta$-O-benzyl-L-aspartate.

Analysis, Calc. for $C_{26}H_{24}N_2O_8$: C, 63.41; H, 4.91; N, 5.69.

Found: C, 62.26; H, 5.00; N, 5.33.

About 3.0 g. of the p-nitrobenzyl ester, 25 ml. of dimethylformamide, and 5 ml. of water were placed in a flask and the pH of the mixture was lowered to about 2.2 by addition of 3N HCl. The resulting mixture was cooled to about 0°C, 800 mg. of zinc was added and the mixture was stirred at 0°C. for about 2 hours. The reaction mixture was then filtered, the filtrate was diluted with 2 volumes of water and the entire mixture was extracted with ethyl acetate. The ethyl acetate extract was treated with 1N sodium bicarbonate and the resulting sodium bicarbonate layer acidified with 1N HCl. The acidified mixture was extracted with ethyl acetate, the extract was washed with water, dried over sodium sulfate, and the ethyl acetate was boiled off. The residue was recrystallized from benzene to afford 0.8 g. of N-benzyloxycarbonyl-$\beta$-O-benzyl-L-aspartic acid, m.p., 106°–7°C.

Analysis, Calc. for $C_{19}H_{19}NO_6$: C, 63.86; H, 5.36; N, 3.92.

Found: C, 64.01; H, 5.32; N, 4.15

EXAMPLE II:

Preparation and Selective Cleavage of p-nitrobenzyl N-tertiary-butoxycarbonyl-$\gamma$-O-benzyl-L-glutamate Using the procedure described in Example I, N-tertiary-butoxycarbonyl-$\gamma$-O-benzyl-L-glutamic acid was prepared. It was converted to the dicyclohexylamine salt and 20.0 g. (0.393 mole) along with 9.32 g. (0.043 mole) ofp-nitrobenzyl bromide were suspended in 200 ml. of dimethylformamide. The resulting reaction mixture was stirred overnight. About 9.4 g. of dicyclohexylamine hydrobromide was collected, and the filtrate was cooled, diluted with water and extracted successively with ethyl acetate, water, saturated sodium bicarbonate and water. The washed filtrate was dried over magnesium sulfate, filtered, and evaporated to dryness. Recrystallization from ether produced 17.82 g. (95.5 percent) of p-nitrobenzyl N-tertiary-butoxycarbonyl-$\gamma$-O-benzyl-L-glutamate, m.p., 79°–82°C.

Analysis, Calc. for $C_{24}H_{28}N_2O_8$: C, 61.01; H, 5.97; N, 5.93; O, 27.09.

Found: C, 60.71; H, 5.85; N, 5.98; O, 26.97.

About 1.4 g. (3 millimoles) of the p-nitrobenzyl ester, 20 ml. of dimethylformamide, and 5 ml. of water were placed in a flask and the pH of the mixture was adjusted to about 2.3 by addition of 3N HCl. The resulting mixture was cooled to about 0°C., 390 mg. of zinc was added and the mixture was stirred at 0°C. for about 1.5 hours. The reaction mixture was filtered, the filtrate was diluted with water, and the precipitated product was filtered. The collected precipitate was dissolved in hot ethyl acetate, a small amount of charcoal was added, and the mixture was filtered. Upon cooling of the filtrate a solid formed and was collected. Recrystallization of the solid from a mixture of methylene chloride and petroleum ether afforded 0.7 g. of N-tertiary-butoxycarbonyl-$\gamma$-O-benzyl-L-glutamic acid, m.p., 138°–140°C.

Analysis, Calc. for $C_{17}H_{23}NO_6$: C, 67.41; H, 8.58; N, 5.42; O, 18.58.

Found: C, 67.38; H, 8.82; N, 5.12; O, 18.29.

EXAMPLE III:

Preparation and Selective Cleavage of the p-nitrobenzyl ester of N-tertiary-butoxycarbonyl-L-tyrosyl(O-benzyl)-L-leucyl-L-aspartyl($\beta$-O-benzyl)-L-serine(O-benzyl) [III]

N-tertiary-butoxycarbonyl-L-aspartic acid, $\beta$-benzyl ester, in an amount of 3.23 g. (0.01 mole) was dissolved in 50 ml. of anhydrous tetrahydrofuran. The resulting solution was cooled to −15°C. and 1.34 ml. (0.01 mole) of isobutyl chloroformate was added, followed by 1.10 ml. (0.01 mole) of N-methylmorpholine. The reaction mixture was then stirred at −15°C. for 3 minutes after which 3.14 g. (0.01 mole) of the p-nitrobenzyl ester of L-serine(O-benzyl) was added. The resulting reaction mixture was stirred at −15° to −10°C. for 1.5 hours and then at 20°C. for 2 hours. At the end of this period, the mixture was poured into 500 ml. of cold water and permitted to stand for 2 hours, during which time a substance oiled out but failed to crystallize. This substance was taken up by extraction into three 200 ml. portions of ether. The combined ether extracts were washed using, in sequence, three 100 ml. portions of 1N $NaHCO_3$, three 100 ml. portions of a one-half saturated citric acid solution, three 100 ml. portions of water, and 100 ml. of saturated NaCl solution. The ether extract was then dried over $MgSO_4$, filtered and evaporated to a syrupy residue which was crystallized from a mixture of ether and petroleum ether to produce 5.35 g. of a product exhibiting a single spot on thin layer chromatography and melting at 61°–64°C. The p-nitrobenzyl ester of N-tertiary-butoxycarbonyl-L-aspartyl($\beta$-O-benzyl)-L-serine-(O-benzyl) [I] was obtained in 85 percent yield.

Analysis, Calc. for $C_{33}H_{37}N_3O_{10}\cdot 1/2\ H_2O$: C, 61.70; H, 6.12; N, 6.52.

Found: C, 61.89; H, 6.18; N, 6.38.

The N-tertiary-butoxycarbonyl blocked product was converted to the trifluoroacetate amine salt by dissolving 5.0 g. (7.86 millimoles) of the N-protected peptide in 20 ml. of trifluoroacetic acid and permitting the mixture to stand at room temperature for one hour. Excess trifluoroacetic acid was removed by evaporation in vacuo. Ether (150 ml.) was added to the residue and a material immediately crystallized and was filtered affording 5.0 g. (92 percent yield) of the trifluoroacetate amine salt having a melting point of 124°–25°C.

To about 1.80 g. (7.5 millimoles) of N-tertiary-butoxycarbonyl-L-leucine in 35 ml. of anhydrous tetrahydrofuran, was added 1.0 ml. (7.5 millimoles) of isobutyl chloroformate followed by 0.82 ml. (7.5 millimoles) of N-methylmorpholine, and the mixture was stirred for about three minutes at −15°C. The previously prepared trifluoroacetate amine salt was converted to the free amine by treatment with N-methylmorpholine, and 5.0 millimoles of the free amine was added to the stirred and cooled mixture. The resulting reaction mixture was stirred for two hours, during which time the temperature rose to −5°C. Saturated aqueous sodium bicarbonate in an amount of 5 ml. was poured into the reaction mixture, and stirring was continued for an additional 30 minutes. Water (300 ml.) was then added, and the mixture was allowed to stand overnight. A resulting solid residue was removed by filtration, triturated with a one-half saturated sodium bicarbonate followed by a one-half saturated citric acid solution. The residue was washed with water, dissolved in hot acetone and reprecipitated by adding water. Upon filtering and drying in vacuo at room temperature, 3.85 g. of material having a softening range at 118°–125°C. and a melting point of 125°–27°C. was recovered. This substance, the p-nitrobenzyl ester of N-tertiary-butoxycarbonyl-L-leucyl-L-aspartyl (β-O-benzyl)-L-serine(O-benzyl) [II], was obtained in theoretical yield.

Analysis, Calc. for $C_{39}H_{48}N_4O_{11}.H_2O$: C, 62.40; H, 6.38; N, 7.10.

Found: C, 62.32; H, 6.33; N, 6.38.

[II] in an amount of 3.0 g. (3.88 millimoles) was placed in 150 ml. of ethyl acetate. p-Toluenesulfonic acid (0.76 g.) was added, and the mixture was concentrated in vacuo to afford a syrup which crystallized upon addition of ether. The resulting precipitate was removed by filtration after standing overnight in a freezer and afforded 2.60 g. of the tosylate amine salt of nitrogen deblocked [II] having a melting point of about 70°C.

Analysis, Calc. for $C_{41}H_{48}N_4O_{12}S$: C, 59.98; H, 5.89; N, 6.83; S, 3.91.

Found: C, 60.13; H, 6.12; H, 6.57; S, 4.08.

A solution was prepared by dissolving 1.15 g. (3.1 millimoles) of N-tertiary-butoxycarbonyl-L-tyrosine(O-benzyl) in 25 ml. of tetrahydrofuran. The solution was cooled to −15°C. and 0.41 ml. (3.1 millimoles) of isobutyl chloroformate and 1 ml. of N-methylmorpholine was added. The mixture was stirred for 3 minutes at −15°C., after which time 2.5 millimoles of the free amine of [II] (prepared by treating the tosylate amine salt of [II] with N-methylmorpholine) was added. The reaction mixture was stirred for 2 hours, during which time the temperature gradually rose to −5°C. Cold saturated aqueous sodium bicarbonate (5 ml.) was added and the mixture was stirred for 15 minutes. The reaction mixture was then diluted with 500 ml. of water and cooled to 5°C. over a 2-hour period. A material precipitated from the mixture and was filtered and air-dried to afford 2.6 g. of slightly yellow product. The impure product was dissolved in 25 ml. of acetone, and a small amount of yellow insoluble material was filtered off. The colorless filtrate was diluted with petroleum ether and colled for about three hours.

Upon filtering, 2.5 g. (100 percent yield) of the p-nitrobenzyl ester of N-tertiary-butoxycarbonyl-L-tyrosyl(O-benzyl)-L-leucyl-L-aspartyl(β-O-benzyl)-L-serine(O-benzyl) -O-benzyl)-L-serine(O-benzyl) [III] melting at 165°–69°C. were obtained. Analysis, Calc. for $C_{55}H_{63}N_5O_{13}.2H_2O$: C, 63.63; H, 6.51; N, 6.75

Found: C, 63.82; H, 6.10: N, 6.65.

The resulting blocked tetrapeptide was selectively cleaved by dissolving 0.5 g. of the tetrapeptide in a mixture of 18 ml. of dimethylformamide and 2 ml. of water, adding 0.5 g. of zinc and and adjusting the pH to 2.5 with 3N HCl. The pH was then held at 2.5 for 3 hours. The product which formed was filtered after being caused to precipitate by addition to the reaction mixture of about 300 ml. of cold water. The collected product was dissolved in 50 ml. of ethyl acetate, and the ethyl acetate solution was washed successively with three 10 ml. portions of one-half saturated citric acid solution, three portions of water and one portion of saturated sodium chloride solution. Recrystallization from ethyl acetate-petroleum ether afforded 0.31 g. (75 percent yield) of N-tertiary-butoxycarbonyl-L-tyrosyl(O-benzyl)-L-leucyl-L-aspartyl(β-O-benzyl)-L-serine(O-benzyl) having a melting point of 128°–29°C.

Analysis, Calc. for $C_{48}H_{58}N_4O_{11}$: C, 66.49; H, 6.74; N, 6.46.

Found: C, 66.23; H, 6.95; N, 6.51.

EXAMPLE IV: Preparation and Selective Cleavage of the p-nitro-benzyl ester of N-tertiary Butoxycarbonyl-L-threonyl(O-benzyl)-L-phenylalanyl-L-threonyl(O-benzyl)-L-seryl(O-benzyl)-L-aspartic(β-O-benzyl) acid [VII]

About 4.36 g. (14.8 millimoles) of N-tertiary-butoxycarbonyl-L-serine(O-benzyl) was dissolved in 240 ml. of tetrahydrofuran containing 2.06 ml. (14.8 millimoles) of triethylamine. The resulting mixture was cooled to −11°C. and 1.94 ml. (14.8 millimoles) of isobutyl chloroformate was added. After about 30 minutes 6.50 g. (14.8 millimoles) of the p-nitrobenzyl ester of β-O-benzyl-L-aspartic acid hydrobromide and 2.06 ml. of triethylamine was added, during which time the temperature of the reaction mixture increased to −7°C. The reaction mixture was stirred for an additional 1.5 hours and then stored in a freezer for 1 hour. The reaction mixture was filtered, and evaporated in vacuo to dryness, and the residue was taken up in about 300 ml. of ethyl acetate. The ethyl acetate solution was washed successively with 5 percent citric acid, water, 2N $KHCO_3$ and water. The washed ethyl acetate solution was dried over magnesium sulfate and evaporated to dryness, and the residue was recrystallized from ethanol to produce 6.80 g. of N-tertiarybutoxycarbonyl-L-seryl(O-benzyl)-L-(β-O-benzyl) aspartic acid, p-nitrobenzyl ester [IV], m.p., 77°–9°C.

About 6.65 g. (10.02 millimoles) of [IV] was dissolved in about 40 ml. of trifluoroacetic acid, and the mixture was permitted to stand for about twenty minutes to convert [IV] to the nitrogen deblocked trifluoroacetate amine salt. Excess trifluoroacetic acid was removed by evaporation in vacuo, yielding the trifluoracetate amine salt as an oil.

About 12.05 g. (38.8 millimoles) of N-tertiary-butoxy-carbonyl-L-threonine (O-benzyl) was dissolved in 1000 ml. of tetra-hydrofuran containing 5.45 g. (38.8 millimoles) of triethylamine. The mixture was cooled to −12°c. and 5.09 ml. (38.8 millimoles) of isobutyl chloroformate was added. The mixture was allowed to stand for about 30 minutes, after which time 25.8 g. of the trifluoracetate amine salt of nitrogen deblocked [IV] dissolved in tetrahydrofuran was added along with 5.45 ml. of triethylamine. After about 2 hours, the mixture was filtered, the tetrahydrofuran was evaporated in vacuo and the residue was dissolved in about 1 liter of ethyl acetate. The ethyl acetate solution was extracted successively with 5 percent citric acid, water, 2N KNCO$_3$ and water, and the ethyl acetate solution was then dried over magnesium sulfate, filtered, and the ethyl acetate removed therefrom in vacuo. The resulting residue was recrystallized from ether to produce 26.46 g. of N-tertiary-butoxycarbonyl-L-threonyl(O-benzyl)-L-seryl (O-benzyl)-L-($\beta$-O-benzyl)aspartic acid, p-nitrobenzyl ester [V].

[V] was converted from the N-tertiary-butoxycarbonyl substituted product to the trifluoroacetate amine salt by dissolving 26.4 g. of [V] in excess trifluoroacetic acid and allowing the mixture to stand for twenty minutes at room temperature. The excess trifluoracetic acid was evaporated in vacuo, and the residue was recrystallized from a mixture of ether and ethyl acetate to produce 23.11 g. of the trifluoroacetate amine salt of nitrogen deblocked [V], m.p., 143°–144°C.

About 11.40 g. (43 millimoles) of N-tertiary-butoxycarboxyl-L-phenylalanine was dissolved in 600 ml. of tetrahydrofuran to which was added 5.5 ml. (40 millimoles) of triethylamine, and the mixture was cooled to −19°C. About 5.2 ml. (40 millimoles) of isobutyl chloroformate was added to the reaction mixture and the mixture was stirred with cooling for about 40 minutes, after which 23.11 g. (27.5 millimoles) of the trifluoroacetate amine salt of nitrogen deblocked [V] was added as a solid, followed by 3.8 ml. (27.5 millimoles) of triethylamine. Upon completion of the addition, the temperature of the reaction mixture rose to −14°C., and the reaction mixture was stirred and cooled for an additional 1 hour. After cooling overnight, the reaction mixture was allowed to come to room temperature and about 400 ml. of 1N KHCO$_3$ was added. An aqueous and an organic phase developed, and the tetrahydrofuran was concentrated in vacuo. Upon concentration of the tetrahydrofuran, a residual solid formed which was then taken up in ethyl acetate. The ethyl acetate was washed successively with water, 5 percent citric acid, water, 2N KHCO$_3$, and water. The ethyl acetate solution was dried over magnesium sulfate, filtered and evaporated in vacuo. Recrystallization of the residue from ether produced 25.32 g. of N-tertiary-butoxycarbonyl-L-phenylalanyl-L-threonyl(O-benzyl)-L-seryl(O-benzyl)-L-($\beta$-O-benzyl)aspartic acid, p-nitrobenzyl ester [VI], m.p., 99°–101°C.

About 11.13 g. (36 millimoles) of N-tertiary-butoxycarbonyl-L-threonine(O-benzyl) were dissolved in 500 ml. of tetrahydrofuran to which was added 5.01 ml. (36 millimoles) of triethylamine. The mixture was cooled to about −14°C. and about 4.58 ml. (35 millimoles) of isobutyl chloroformate was added. After about 40 minutes, about 23.0 g. (23.3 millimoles) of the trifluoroacetate amine salt of nitrogen deblocked [VI] (prepared in a manner similar to that previously described in preparing the trifluoroacetate amine salt of nitrogen deblocked [V]) was added, followed by 3.2 ml. (23.3 millimoles) of triethylamine. The reaction mixture was stirred and cooled for an additional 0.5 hours, after which the reaction mixture was placed in a freezer overnight. The reaction mixture was removed from the freezer and 200 ml. each of water and 2N KHCO$_3$ were added. The tetrahydrofuran was evaporat in vacuo to produce a residual solid which was insoluble in the aqueous layer. The solid was filtered and recrystallized from ethanol and water to produce 24.80 g. of N-tertiary-butoxycarbonyl-L-threonyl(O-benzyl)-L-phenylalanyl-L-threonyl(O-benzyl)-L-seryl (O-benzyl)-L-seryl -O-benzyl)aspartic acid, p-nitrobenzyl ester [VII], m.p., 132°–6°C.

Analysis, Calc. for $C_{64}H_{72}N_6O_{15}$: C, 65.96; H, 6.23; N, 7.21.

Found: C, 65.94; H, 6.31; N, 7.06.

About 2.30 g. (1.97 millimoles) of [VII] was dissolved in 100 ml. of 90 percent aqueous dimethylformamide. About 2 g. of zinc dust was added, and the reaction mixture was maintained for 2 ½ hours at a pH of about 3.2 using 3N HCl. The reaction mixture was then filtered, diluted with water to about 800 ml., and filtered again. The solid which was collected by filtration was taken up in ethyl acetate, and the ethyl acetate solution was washed with 5 percent aqueous citric acid, then with water and was then dried over magnesium sulfate. The ethyl acetate was evaporated in vacuo, and the residue was recrystallized from ethanol to produce 1.60 g. of the selectively cleaved N-tertiary-butoxycarbonyl-L-threonyl(O-benzyl)-L-phenylanyl-L-threonyl(O -benzyl)-L-seryl(O-benzyl)-L-($\beta$-O-benzyl)aspartic O-benzyl)aspartic acid, having a melting point of 170°–171°C.

Analysis, Calc. for $C_{57}H_{67}N_5O_{13}$: C, 66.45; H, 6.56; N, 6.80.

Found: C, 66.54; H, 6.81; N, 6.85.

Analysis for amino acid residues in the above structure indicated the presence of 1.00 aspartic acid residue, 1.85 threonine residue, 0.93 serine residue, and 0.98 phenylalanine residue.

EXAMPLE V:

Preparation and Selective Cleavage of the p-nitrobenzyl ester of N-tertiary butoxycarbonyl-L-tyrosyl(O-benzyl)-L-seryl(O-benzyl)-L-lysyl($\epsilon$-N-carbobenzoxy)-L-tyrosyl (O-benzyl)-L-leucyl-L-($\beta$-O-benzyl)aspartic acid [XII]

About 7.47 g. (30.0 millimoles) of N-tertiary-butoxycarbonyl-L-leucine was dissolved in 100 ml. of tetrahydrofuran and 4.18 ml. (30.0 millimoles) of triethylamine was added. The resulting mixture was cooled to −14°C. and about 3.90 ml. (29.8 millimoles) of isobutyl chloroformate was added. The mixture was stirred with cooling for about 25 minutes after which 9.22 g. (21.0 millimoles) of the hydrobromide salt of the p-nitrobenzyl ester of $\beta$-0-benzyl aspartic acid was added along with 2.92 ml. (21.0 millimoles) of triethylamine. The mixture was stirred and cooled for an additional 45 minutes, after which it was permitted to stand overnight. To the reaction mixture was then added about 100 ml. of 2N KHCO$_3$ and the mixture was stirred for about 4.5 hours, after which the tetrahydrofuran was removed in vacuo. The aqueous residue was extracted with ethyl acetate, and the ethyl acetate extract was washed successively with water, 5 percent citric acid, water, 2N KHCO$_3$, and water. The washed ethyl acetate extract was then dried over magnesium sulfate, filtered and evaporated in vacuo. The residue was recrystallized from ethanol-water to produce 7.24 g. of the p-nitrobenzyl ester of N-tertiary-butoxycarbonyl-L-leucyl-L-($\beta$-0-benzyl)aspartic acid [VIII], m.p., 69°–71°C.

About 8.90 g. (15.56 millimoles) of [VIII] were dissolved in 150 ml. of a mixture of 90 percent trifluoroacetic acid and 10 percent water. The solution was maintained for about 1.5 hours, after which the excess trifluoroacetic acid was evaporated in vacuo. The residual oil, the trifluoroacetate amine salt of the nitrogen deblocked [VIII], was dissolved in about 100 ml. of tetrahydrofuran and set aside for subsequent use.

About 7.43 g. (20.0 millimoles) of N-tertiary-butoxycarbonyl-L-(O-benzyl)tyrosine was dissolved in about 100 ml. of tetrahydrofuran and about 2.24 ml. (20.0 millimoles) of N-methylmorpholine was added. The mixture was cooled and about 2.50 ml. (19.0 millimoles) of isobutyl chloroformate was added. After about 25 minutes, the solution of the trifluoroacetate amine salt of the nitrogen deblocked [VIII] in tetrahydrofuran was added, followed by 1.75 ml. (15.6 millimoles) of N-methylmorpholine. The mixture was stirred with cooling for an additional 25 minutes and then stored overnight in a freezer. The reaction mixture was then permitted to come to room temperature and about 50 ml. of 2N aqueous $KHCO_3$ was added with stirring for about 30 minutes. The tetrahydrofuran was removed in vacuo, and the aqueous residue was extracted with ethyl acetate. The ethyl acetate extract was washed successively with water, 5 percent citric acid, water, 2N $KHCO_3$ and water, dried over magnesium sulfate, and filtered, and the ethyl acetate was evaporated in vacuo. The residue was recrystallized from ethanol to produce 11.66 g. of the p-nitrobenzyl ester of N-tertiary-butoxycarbonyl-L-tyrosyl(O-benzyl)-L-leucyl-L-($\beta$-O-benzyl)aspartic acid [IX], m.p., 131°–3°C.

Analysis, Calc. for $C_{45}H_{52}N_4O_{11}$: C, 65.52; H, 6.35; N, 6.79; O, 21.33.

Found: C, 65.74; H, 6.43; N, 6.62; O, 21.59.

About 11.49 g. (13.92 millimoles) of [IX] was dissolved in 150 ml. of a mixture of 90 percent trifluoroacetic acid and 10 percent water. The mixture was maintained for about 1 hour after which the trifluoroacetic acid excess was evaporated in vacuo. About 11.16 g. of the cystalline trifluoroacetate amine salt of the nitrogen deblocked [IX] was recovered from the residue with ether.

About 11.18 g. (20.0 millimoles) of $N^{\alpha}$-tertiary-butoxycarbonyl-N-$\epsilon$-carbobenzoxylysine was dissolved in about 150 ml. of tetrahydrofuran. The solution was cooled to about −12°C. and about 2.50 ml. (18.0 millimoles) of triethylamine and 2.23 ml. (17.0 millimoles) of isobutyl chloroformate were added. The mixture was stirred and cooled for about 30 minutes, after which the trifluoroacetate amine salt of the nitrogen deblocked [IX] was added, followed by 1.81 ml. (13.0 millimoles) of triethylamine. Stirring with cooling was continued for an additional one hour, after which the reaction mixture was placed in a freezer overnight. The reaction mixture was brought to room temperature and stirred for about 0.5 hour with addition of about 50 ml. of 2N $KHCO_3$. The mixture was then concentrated in vacuo, and the residue was extracted with 500–600 ml. of ethyl acetate. The ethyl acetate extract was washed successively with water, 5 percent citric acid, water, 2N $KHCO_3$, and water, dried over magnesium sulfate, filtered, and evaporated in vacuo. Recrystallization from ethanol and water afforded 12.47 g. of the p-nitrobenzyl ester of N-tertiary-butoxycarbonyl-L-lysyl($\epsilon$-N-carbobenzoxy)-L-tyrosyl(O-benzyl)-L-($\beta$-O-benzyl)aspartic acid [X], m.p., 140°–4°C.

Analysis, Calc. $C_{59}H_{70}N_6O_{14}$: C, 65.18; H, 6.49; N, 7.73; O, 20.60.

Found: C, 65.40; H, 6.56; N, 7.70; O, 20.82.

About 12.15 g. (11.17 millimoles) of [X] was added to 150 ml. of a mixture of 90 percent trifluoroacetic acid and 10 percent water at room temperature. The mixture was maintained for about one hour after which excess trifluoroacetic acid was evaporated in vacuo, and the residual oil, the trifluoroacetate amine salt of the nitrogen deblocked [X], was precipitated by addition of ether.

About 4.44 g. (15.0 millimoles) of N-tertiary-butoxycarbonyl-O-benzylserine was dissolved in 100 ml. of tetrahydrofuran to which was added about 2.0 ml. (15.0 millimoles) of triethylamine. The mixture was stirred and cooled, and 1.8 ml. (14.0 millimoles) of isobutyl chloroformate was added. Stirring and cooling were continued for about 45 minutes after which the trifluoroacetate amine salt of the nitrogen deblocked [X] dissolved in 75 ml. of tetrahydrofuran was added, followed by 1.5 ml. (11.1 millimoles) of triethylamine. Stirring with cooling was continued for about 20 minutes, after which the reaction mixture was maintained at −15°C. overnight. About 50 ml. of 2N $KHCO_3$ and 50 ml. of water were added at room temperature. The mixture was then concentrated in vacuo, and the residue was extracted with ethyl acetate. The ethyl acetate extract was washed with water, 5 percent citric acid, water, 2N $KHCO_3$ and water, dried over magnesium sulfate, filtered, and evaporated in vacuo, and the residue was recrystallized from ethanol and water to produce 12.57 g. of N-tertiary-butoxycarbonyl-L-seryl (O-benzyl)-L-lysyl($\epsilon$-carbobenzoxy)-L-tyrosyl(O-benzyl)-L-leucyl-L-($\beta$-O-benzyl)aspartic acid, p-nitrobenzyl ester [XI], m.p., 146°C.

Analysis, Calc. for $C_{69}H_{81}N_7O_{16}$: C, 65.54; H, 6.46; N, 7.75; O, 20.24.

Found: C, 64.73; H, 6.88; N, 7.47; O, 21.63.

About 12.13 g. (9.83 millimoles) of [XI] was added to 150 ml. of a mixture of 90 percent trifluoroacetic acid and 10 percent water at room temperature. The mixture was maintained for about 1.5 hours after which the excess trifluoroacetic acid was evaporated in vacuo. The residue was crystallized using ether to produce 12.13 g. of the trifluoroacetate amine salt of the nitrogen deblocked [XI].

About 5.58 g. (15.0 millimoles) of N-tertiary-butoxycarbonyl-O-benzyltyrosine was dissolved in 100 ml. of tetrahydrofuran to which was added 2.0 ml. (15.0 millimoles) of triethylamine. The mixture was stirred and cooled to −14°C. and 1.85 ml. (14.1 millimoles) of isobutyl chloroformate was added. The mixture was stirred and cooled for an additional 1 hour. The trifluoroacetate amine salt of the nitrogen deblocked [XI] was then added along with 50 ml. of tetrahydrofuran and 1.36 ml. (9.8 millimoles) of triethylamine. Stirring and cooling were continued for an additional hour, after which the mixture was placed in a freezer at about −15°C. overnight. To the reaction mixture was added 50 ml. of 1N $KHCO_3$, and the mixture was diluted to 500 ml. by addition of water. A solid formed which was filtered, and the filter cake was washed with water, citric acid, and water, and was then dissolved in hot ethanol. Recrystallization from ethanol produced 12.06 g. of N-tertiary-butoxycarbonyl-L-tyrosyl(O-benzyl)-L-seryl(O-benzyl)-L-lysyl($\epsilon$-carbobenzoxy)-L-tyrosy (O-benzyl)-L-leucyl-L(O-benzyl) aspartic acid, p-nitrobenzyl ester [XII], m.p., 177°–9°C.

Analysis, Calc. for $C_{85}H_{96}N_8O_{18}$: C, 67.27; H, 6.38; N, 7.38; O, 18.94.

Found: C, 66.98; H, 6.50; N, 7.43; O, 19.20.

About 5.19 g. (3.41 millimoles) of [XII] was dissolved in a mixture of 135 ml. of dimethylformamide and 15 ml. of water. The pH of the mixture was adjusted to about 2.3 by addition of 3N HCl, and about 5.5 g. of zinc dust was then added. The mixture was maintained for about 5 hours at a pH of 2.6–2.8 with 3N HCl, filtered to remove excess zinc, and diluted with water to about one liter to precipitate the product. The product was filtered and recrystallized from dilute acetic acid to produce 4.37 g. of N-tertiary-butoxycarbonyl-L-tyrosyl(O-benzyl)-L-seryl(O-benzyl)-L-lysyl(⅓-carbobenzoxy)-L-tyrosyl(O-benzyl)-L-leucyl-L(O-benzyl) aspartic acid, m.p., 173–7°C.

Analysis, Calc. for $C_{78}H_{91}N_7O_{16}$: C, 67.76; H, 6.63; N, 7.09; O, 18.51.

Found: C, 67.48; H, 6.90; N, 7.11; O, 18.80.

EXAMPLE VI:

Preparation and Selective Cleavage of the p-nitrobenzyl ester of $N^\alpha$,$N^{im}$-di(adamantyloxycarbonyl)-L-histidyl-L-seryl(O-benzyl)-L-glutamyl-glyoyl-L-threonyl(O-benzyl)-L-phenylalanyl-L-threonyl(O-benzyl)-L-seryl(O-benzyl)-L-($\beta$-O-benzyl)aspartic acid [XVI]

To 84.0 g. (0.3 mole) of N-carbobenzoxy-L-glutamine dissolved in 400 ml. of a 1:1 mixture of tetrahydrofuran and acetonitrile and containing 33 ml. (0.3 mole) of N-methylmorpholine maintained at −15°C. was added 38.4 ml. (0.295 mole) of isobutyl chloroformate. The mixture was stirred for 5 minutes and a solution of 41.7 g. (0.3 mole) of ethyl glycinate hydrochloride and 33 ml. of N-methylmorpholine in 200 ml. of dimethylformamide was added. The mixture was stirred for an additional 2 hours at −15°C. and then warmed to 0°C. and maintained thereat for 1 hour. A solid precipitated and was filtered off. The solid material was suspended in 1 liter of 0.5N HCl and maintained at 4°C. for 3 days. The mixture was then filtered, and the solid was washed with water and suspended in a solution of 0.5N KHCO₃ for 3 hours. The solid was filtered, washed with water, and recrystallized from methanol to produce 38.0 g. of the ethyl ester of N-carbobenzoxy-L-glutamyl-glycine [XIII], m.p., 159°–160°C.

Analysis, Calc. for $C_{17}H_{23}N_3O_6$: C, 55.60; H, 6.35; N, 11.50; O, 26.30.

Found C, 55.39; H, 6.21; N, 12.40; O, 26.81.

About 36.6 g. (0.10 mole) of [XIII] was suspended in about 700 ml. of methanol. The mixture was stirred and 4.0 g. of 5 percent palladium on carbon was added. The solution was cooled to 0°C., and 8.7 ml. of concentrated HCl was added in 3 portions, 2.9 ml. initially, 2.9 ml. after one hour, and 2.9 ml. after 2 hours. During this period, the mixture was blanketed with nitrogen and hydrogenated, using a gas dispersion tube. The hydrogenation was carried out until no more carbon dioxide evolved. The reaction mixture was then filtered to remove the catalyst, and the filtrate was evaporated to dryness to produce the hydrochloride amine salt of the nitrogen deblocked di-peptide of [XIII].

About 32.5 g. (0.1 mole) of N-tertiary-butoxycarbonyl-L-serine(O-benzyl) was dissolved in 100 ml. of dimethylformamide. The solution was cooled to −15°C. and 13.7 ml. (0.10 mole) of isobutyl chloroformate and 12.1 ml. (0.11 mole) of N-methylmorpholine were added. The reaction mixture was stirred for about 4 minutes at −15°C., and then a solution of the nitrogen deblocked [XIII] was added. The added nitrogen deblocked [XIII] had previously been prepared by dissolving 0.1 mole of its hydrochloride amine salt in 100 ml. of dimethylformamide, cooling the mixture to −15°C., and adding 11.0 ml. of N-methylmorpholine. The resulting reaction mixture containing the added nitrogen deblocked [XIII] was stirred for 2 hours at −15°C., and 25 ml. of cold saturated aqueous KHCO₃ was added. The reaction mixture was stirred for an additional 20 to 25 minutes, after which about 1500 ml. of water was added. The mixture was cooled for 3 days and was then filtered and washed successively with water, saturated NaHCO₃ and water. Recrystallization from ethanol produced 45.52 g. of N-tertiary-butoxycarbonyl-L-seryl(O-benzyl)-L-glutamyl-glycine, ethyl ester [XIV], m.p., 170°–3°C.

Analysis, Calc. for $C_{24}H_{36}N_4O_8$: C, 56.75; H, 7.15; N, 11.01; O, 25.2.

Found: C, 56.55; H, 7.12; N, 11.11; O, 25.01.

About 39.1 g. (0.077 mole) of [XIV] was suspended in 300 ml. of a 4:1 mixture of acetone and water, and 84.6 ml. (0.085 mole) of a 1N LiOH solution was added dropwise over a 30-minute period. The reaction mixture was stirred for about 45 minutes and then filtered, and 84.6 ml. of 1N HCl was added to the filtrate. Acetone was evaporated from the mixture, water was added, and the mixture was boiled and cooled overnight. A precipitate formed which was filtered and recrystallized from a mixture of ethanol and ether to produce about 31 g. of the free acid of [XIV], m.p., 159°–61°C.

Analysis, Calc. for $C_{22}H_{32}N_4O_8$: C, 54.99; H, 6.71; N, 11.66; O, 26.64.

Found: C, 55.18; H, 6.95; N, 11.88; O, 26.60.

About 12.84 g. (0.026 mole) of the free acid of [XIV] was added to 60 ml. of cold trifluoroacetic acid containing 3 g. of phenol. The mixture was stirred for 30 minutes at 0°C. and then diluted to 500 ml. with anhydrous ether. The solution was then cooled, solid filtered off, and the solid dried overnight over sodium hydroxide. The solid was then dissolved in water and the pH of the solution was adjusted to 5.8 with pyridine. About 500 ml. of ethanol was added and the mixture was cooled. A solid precipitated which was filtered, washed with ethanol and ether, and dried in vacuo, to produce 5.45 g. of the nitrogen deblocked free acid of [XIV], m.p., 208°–10°C.

About 3.88 g. (0.01 mole) of the nitrogen deblocked free acid of [XIV] was suspended in a mixture of 150 ml. of pyridine and 40 ml. of dimethylformamide containing 1.4 ml. of triethylamine. The mixture was stirred for about 3 hours at 5°C. and then cooled to −15°C. and stirred for an additional 2 hours. About 9.2 g. (0.015 mole) of $N^\alpha$,$N^{im}$-di(adamantyloxycarbonyl)-L-histidine as the succinimide ester was added. The reaction mixture was stirred at −15°C. for about 2.5 days. The temperature was then raised to 0°–4°C. and stirring was continued for an additional 2 days. About 800 ml. of ether was then added to the reaction mixture, and the mixture was maintained at −15°C. overnight, during which time a solid precipitated. The solid was filtered and recrystallized from a mixture of methanol, ethyl acetate, and ether to afford 7.0 g. of $N^\alpha$,$N^{im}$-di(adamantyloxycarbonyl)-L-histidyl-L-seryl(O-benzyl)-L-glutamyl-glycine [XV].

Analysis, Calc. for $C_{45}H_{59}N_7O_{11}$: C, 61.84; H, 6.80; N, 11.22.

Found: C, 61.60; H, 6.99; N, 11.11.

About 1.40 g. (1.63 millimoles) of [XV] and 2.00 g.

(1.69 millimoles) of the trifluoroacetate amine salt of the p-nitrobenzyl ester of L-threonyl(O-benzyl)-L-phenylalanyl-L-threonyl(O-benzyl)-L-seryl(O-benzyl)-L-aspartic(β-O-benzyl) acid (prepared from the product of Example IV) were dissolved in 25 ml. of dimethylacetamide. About 0.38 g. (3.3 millimoles) of N-hydroxysuccinimide was added, and the mixture was cooled to about −15°C. To the reaction mixture were added about 0.18 ml. (1.63 millimoles) of N-methylmorpholine and 0.34 g. (1.63 millimoles) of dicyclohexylcarbodiimide in 5 ml. of dimethylacetamide. The reaction mixture was maintained at −15°C. overnight, raised to 4°C. and maintained thereat for 3 days, and then raised to room temperature and maintained thereat for 3 additional days. The reaction mixture was then filtered to remove dicyclohexylurea. The product was precipitated by the addition of water to the filtrate. The product was filtered and recrystallized from a mixture of ethanol, dimethylformamide and water to produce 2.40 g. of the p-nitrobenzyl ester of $N^\alpha$, $N^{im}$-di(adamantyloxycarbonyl)-L-histidyl-L-seryl(O-benzyl)-L-glutamyl-glycyl-L-threonyl(O-benzyl)-L-phenylal-anyl-L-threonyl(O-benzyl)-L-seryl(O-benzyl)-L-(O-benzyl) aspartic acid [XVI], m.p., 219°–20°C.

Analysis, Calc. for $C_{101}H_{123}N_{13}O_{23}$: C, 64.28; H, 6.57; N, 9.65; O, 19.50.

Found: C, 63.66; H, 6.65; N, 9.19; O, 20.14.

About 1.0 g. (0.53 millimoles) of [XVI] was dissolved in a mixture of 45 ml. of dimethylformamide and 5 ml. of water. About 1.5 g. of zinc dust was added and the mixture was maintained at a pH of 3.2 with 3N HCl for about 7 hours, after which the mixture was refrigerated overnight. The mixture was then filtered to remove excess zinc, and the filtrate was diluted with about 400 ml. of water, cooled to about 0°C. and filtered. The wet filter cake obtained upon filtration was then dissolved in about 14 ml. of warm acetic acid, and the solution was cooled to room temperature. The product was precipitated by addition of 7 ml. of water. The mixture was cooled and filtered, and the filter cake was recrystallized from a mixture of 30 ml. of acetic acid and 15 ml. of water. A second recrystallization from ethanol produced 0.69 g. of $N^\alpha$, $N^{im}$-di(adamantyloxycarbonyl)-L-histidyl-L-seryl(O-benzyl)-L-glutamyl-glycyl-L-threonyl(O-benzyl)-L-phenylalanyl-L-threonyl(O-benzyl)-L-seryl(O-benzyl)-L-(β-O-benzyl)aspartic acid, the free acid of [XVI], m.p. 229°–32°C.

Analysis, Calc. for $C_{94}H_{117}N_{12}O_{20}$: C, 65.07; H, 6.80; N, 9.69.

Found: C, 64.12; H, 6.90; N, 10.00.

The reaction product was further distinguished from the starting material by the observation that the product, under thin-layer chromatography, does not move from the origin in a mixture of chloroform, methanol, and acetic acid, whereas in the same system the starting material has a $R_f$ value of about 0.8.

EXAMPLE VII:

Preparation and Selective Cleavage of the p-nitrobenzyl ester of $N^\alpha$, $N^{im}$-di(admantyloxycarbonyl)-L-histidyl-L-seryl(O-benzyl)-L-glutamyl-glycyl-L-threonyl(O-benzyl)-L-phenylalanyl-L-threonyl(O-benzyl)-L-seryl(O-benzyl)-L-aspartyl(β-O-benzyl)-L-tyrosyl(O-benzyl)-L-seryl(O-benzyl)-L-lysyl(ε-N-carbobenzoxy)-L-tyrosyl(O-benzyl)-L-leucyl-L-(β-O-benzyl)aspartic acid [XVII]

About 4.0 g. of the p-nitrobenzyl ester of n-tertiary butoxycarbonyl-L-tyrosyl(O-benzyl)-L-seryl(O-benzyl)-L-lysyl(ε-n-carbobenzoxy)-L-tyrosyl(O-benzyl)-L-leucyl-L-(β-O-benzyl)aspartic acid [XII]

was suspended in 35 ml. of glacial acetic acid containing 1.0 ml. of triethylsilane and 2 ml. of anisole. Dry HCl was bubbled through this mixture for about 45 minutes, and the resulting product was precipitated by addition of ether and reprecipitated twice from a mixture of ethanol and ether to afford 3.0 g. of the hydrochloride amine salt of the nitrogen deblocked [XII].

Analysis, Calc. for $C_{80}H_{88}N_8O_{16}Cl$: C, 66.13; H, 6.10; N, 7.71.

Found: C, 65.31; H, 6.39; N, 7.67.

About 1.8 g. of $N^\alpha$, $N^{im}$-di(adamantyloxycarbonyl)-L-histidyl-L-seryl(O-benzyl)-L-glutamyl-glycyl-L-threonyl(O-benzyl)-L-phenylalanyl-L-threonyl(O-benzyl)-L-seryl(O-benzyl)-L-(β-O-benzyl) aspartic acid, the free acid of [XVI], was dissolved in 10 ml. of N-methylpyrrolidone, and the mixture was allowed to stand overnight. The free amine of [XII] was prepared by dissolving 2.0 g. of the hydrochloride amine salt of the nitrogen-deblocked [XII] in 10 ml. of dimethylformamide and adding sufficient dicyclohexylamine to neutralize exactly the HCl present, cooling to 0°C. for 1 hour, and removing the dicyclohexylamine hydrochloride by centrifuging. The free amine of [XII] was added to the mixture containing the free acid of [XVI] followed by 0.19 g. of ketotriazine and 0.29 g. of dicyclohexylcarbodiimide. The reaction mixture was stirred for 4 days at 0°C. and 1 day at room temperature. The reaction mixture was then diluted with methanol and the resulting precipitate was centrifuged to recover about 2.2 g. of the p-nitrobenzyl ester of $N^\alpha$, $N^{im}$-di(admantyloxycarbonyl)-L-histidyl-L-seryl(O-benzyl)-L-glutamyl-glycyl-L-threonyl(O-benzyl)-L-phenylalanyl-L-threonyl(O-benzyl)-L-seryl(O-benzyl)-L-aspartyl(β-O-benzyl)-L-tyrosyl(O-benzyl)-L-lysyl(ε-N-carbobenzoxy)-L-tyroxyl(O-benzyl)-L-leucyl-L-(β-O-benzyl)aspartic acid [XVII].

Analysis, Calc. for $C_{174}H_{203}N_{20}O_{35}$: C, 66.36; H, 6.42; N, 8.74.

Found: C, 66.08; H, 6.14; N, 8.92.

[XVII] was selectively cleaved using zinc and HCl in the manner of the preceding examples to produce the free acid of [XVII].

Analysis, Calc. for $C_{167}H_{198}N_{19}O_{33}$: C, 66.56; H, 6.51; N, 8.68.

Found: C, 65.10; H, 6.55; N, 9.05.

I claim:

1. A compound 13 selected from the group consisting of

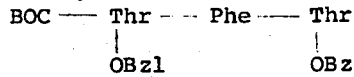

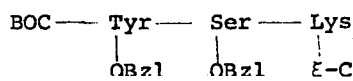

—Continued

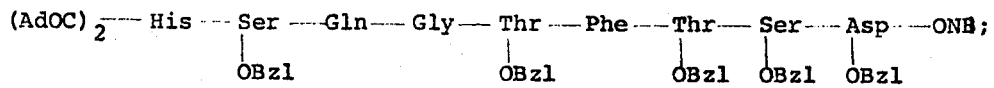

and 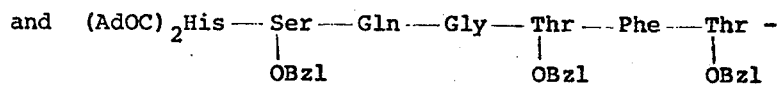

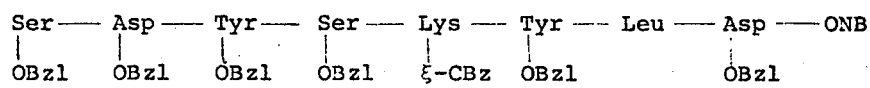

2. A process for selectively cleaving a compound of the formula

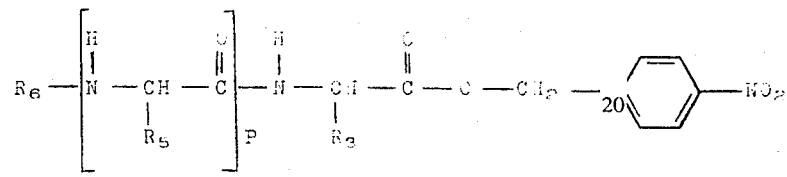

in which $R_3$ and each $R_5$ independently are hydrogen, $C_1-C_5$ alkyl, hydroxy-substituted $C_1-C_5$ alkyl, protected hydroxy-substituted $C_1-C_5$ alkyl, amino-substituted $C_1-C_5$ alkyl, protected amino-substituted $C_1-C_5$ alkyl, mercapto-substituted $C_1-C_5$ alkyl, protected mercapto-substituted $C_1-C_5$ alkyl, $C_1-C_5$ alkyl mercapto-substituted $C_1-C_5$ alkyl, guanidino-substituted $C_1-C_5$ alkyl, protected guanidino-substituted $C_1-C_5$ alkyl, imidazolylmethyl, protected imidazolylmethyl, indolylmethyl, phenyl, 4-hydroxyphenyl, protected 4-hydroxyphenyl, carbamyl-substituted $C_1-C_5$ alkyl, or carboxy-substituted $C_1-C_5$ alkyl protected by a benzyl group, at least one $R_3$ or $R_5$ being a benzyl protected carboxy-substituted $C_1-C_5$ alkyl;

$R_6$ is hydrogen or an amino-protecting group; and P is O or an integer from 1 to 14;

which comprises reducing said compound with zinc and dilute acid and thereby cleaving the

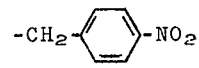

group from its carboxy function while avoiding cleavage of all other protected carboxy substituents.

3. The process of claim 2, in which said compound is selectively cleaved by reduction with zinc and dilute hydrochloric acid.

4. The process of claim 3, in which the reduction is carried out at a pH in the range of from 2.0 to about 4.5.

* * * * *